(12) United States Patent
Ermolov et al.

(10) Patent No.: US 12,519,210 B2
(45) Date of Patent: Jan. 6, 2026

(54) MILLIMETER-WAVE ANTENNA ARRAY APPARATUS

(71) Applicant: Teknologian tutkimuskeskus VTT Oy, Espoo (FI)

(72) Inventors: Vladimir Ermolov, Vtt (FI); Antti Lamminen, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 270 days.

(21) Appl. No.: 18/266,407

(22) PCT Filed: Dec. 3, 2021

(86) PCT No.: PCT/FI2021/050844
§ 371 (c)(1),
(2) Date: Jun. 9, 2023

(87) PCT Pub. No.: WO2022/129682
PCT Pub. Date: Jun. 23, 2022

(65) Prior Publication Data
US 2024/0047854 A1  Feb. 8, 2024

(30) Foreign Application Priority Data
Dec. 15, 2020 (FI) ..................... 20206304

(51) Int. Cl.
*H01Q 1/22* (2006.01)
*H01L 23/66* (2006.01)
*H01Q 3/26* (2006.01)
*H01Q 21/00* (2006.01)

(52) U.S. Cl.
CPC ........... *H01Q 1/2283* (2013.01); *H01L 23/66* (2013.01); *H01Q 3/26* (2013.01); *H01Q 21/0006* (2013.01);
(Continued)

(58) Field of Classification Search
CPC ... H01L 2924/1423; H01L 23/66; H01Q 1/22; H01Q 1/2283; H01Q 21/00;
(Continued)

(56) References Cited

U.S. PATENT DOCUMENTS 6,166,705 A * 12/2000 Mast ................. H01Q 21/0025
342/372
9,124,006 B2 * 9/2015 Ding ................. H01Q 21/0075
(Continued)

FOREIGN PATENT DOCUMENTS

WO   WO 02/065578 A2   8/2002

OTHER PUBLICATIONS

Finnish Search Report of application No. 20206304 dated Aug. 11, 2021.
(Continued)

*Primary Examiner* — Tho G Phan
(74) *Attorney, Agent, or Firm* — Birch, Stewart, Kolasch & Birch, LLP

(57) ABSTRACT

The present invention relates to a millimeter wave RF antenna array apparatus. The apparatus comprises a single-chip MMIC comprising active circuit elements of the antenna array apparatus. The active circuit elements comprise at least antenna feed circuitry configured to feed antenna elements of the antenna array. The apparatus comprises an interposer fabricated of low-loss RF material, such as glass, low-temperature co-fired ceramic, LTCC, or printed circuit board, PCB. The interposer comprises transmission lines of a RF distribution network and a plurality of antenna elements of the antenna array. The transmission lines of the interposer are coupled to the MMIC for providing RF connections for distributing RF signals to and from the antenna feed circuitry. Area of the interposer that comprises the transmission lines of the RF distribution network and the
(Continued)

plurality of antenna elements is collocated with the area of the MMIC that comprises said antenna feed circuitry.

13 Claims, 3 Drawing Sheets

(52) U.S. Cl.
CPC . *H01Q 21/0093* (2013.01); *H01L 2924/1423* (2013.01)

(58) Field of Classification Search
CPC ........... H01Q 21/0006; H01Q 21/0075; H01Q 21/0093; H01Q 21/06; H01Q 21/061; H01Q 23/00; H01Q 3/26; H01Q 21/0031; H05K 1/00
See application file for complete search history.

(56) References Cited

U.S. PATENT DOCUMENTS

| | | | |
|---|---|---|---|
| 9,153,863 B2* | 10/2015 | Nair | H01Q 1/2283 |
| 9,231,311 B2* | 1/2016 | Tiezzi | H01Q 3/26 |
| 9,343,816 B2* | 5/2016 | Lee | H01Q 21/065 |
| 10,749,268 B2* | 8/2020 | Lynch | H01Q 21/08 |
| 2008/0291115 A1 | 11/2008 | Doan et al. | |
| 2015/0340765 A1 | 11/2015 | Dang et al. | |
| 2017/0237181 A1 | 8/2017 | Chen et al. | |
| 2018/0191051 A1 | 7/2018 | Ndip et al. | |
| 2020/0194901 A1 | 6/2020 | Lynch | |
| 2020/0212594 A1 | 7/2020 | Kirino et al. | |

OTHER PUBLICATIONS

International Search Report (PCT/ISA/210) issued in PCT/FI2021/050844 mailed on Mar. 14, 2022.
Written Opinion (PCT/ISA/237) issued in PCT/FI2021/050844 mailed on Mar. 14, 2022.
Zihir et al., "60-GHz 64- and 256-Elements Wafer-Scale Phased-Array Transmitters Using Full-Reticle and Subreticle Stitching Techniques", IEEE Transactions On Microwave Theory and Techniques, vol. 64, No. 12, Dec. 2016, pp. 4701-4719.

* cited by examiner

MILLIMETER-WAVE ANTENNA ARRAY APPARATUS

CROSS-REFERENCE TO RELATED APPLICATIONS

This application is a National Phase Entry under 35 U.S.C. § 371 of PCT International Application No. PCT/FI2021/050844 filed Dec. 3, 2021, which claims the benefit of Finnish Patent Application No. 20206304 filed Dec. 15, 2020, the disclosure of each of these applications are expressly incorporated herein by reference in their entirety.

FIELD

The disclosure relates to antennas, and particularly to antenna arrays suitable for beam forming on millimeter-wave (mm-wave) frequencies.

The present invention relates to an apparatus related to millimeter-wave antenna arrays. More particularly, the present invention relates to a structure of an apparatus for a millimeter-wave antenna array.

BACKGROUND

Use of phased antenna arrays at millimeter-wave frequencies offers a path to support multiple users with high data rates by establishing high-bandwidth directional links between a base station and mobile devices. Millimeter waves occupy the frequency spectrum from 30 GHz to 300 GHz, and the wavelength is in the range between 1 mm to 10 mm. Millimeter-wave frequencies are of significant interest for future 5G networks with high capacity requirements.

Number of elements in an antenna array is a critical parameter for phased antenna array performance. Number of elements defines effective isotropic radiated power and characteristics of an antenna beam, including beam width. For example, while a typical 64-element, 94-GHz silicon phased antenna array can cover only tens of meters, a 1024-element silicon phased antenna array can form a link at more than 10 km. Thus scaling, in other words increasing number of antenna elements of antenna arrays is important.

When implementing an antenna array apparatus coupled to a transmitter or receiver, multiple radio frequency (RF), direct current (DC) and digital distribution networks, such as a serial peripheral interface (SPI), signals should be distributed for RF chips. The SPI is an example of an interface for controlling operation of active circuit elements. In addition, local oscillator (LO), baseband and intermediate frequency (IF) signals may be required for a transceiver depending on architecture. Routing of RF at mm-wave frequencies, DC and SPI interconnections on an interposer is a challenge even with small number of antenna array elements. Term interposer refers to a carrier platform, for example a carrier printed circuit board (PCB) or other equivalent carrier platform, commonly used in electronics applications. Routing of signals is one of the major reasons that limit the number of antenna elements into about 64 to 256 antenna elements in practice, depending on frequency.

Complexity of the problem is growing further with increasing frequency. For example, distance between adjacent antenna elements in a D-band antenna array, operating in frequency range between 110 GHz and 170 GHz and with wavelengths between 2.7 mm and 1.8 mm, is only about 1 mm. Thus, there is very limited space for routing multiple interconnections. At the same time, realistic applications for D-band request more than 1000 antenna elements in an array.

Such implementation of scaling antenna arrays is by far the most popular among multi-IC scaled silicon-based phased antenna arrays.

DESCRIPTION OF THE RELATED ART

Samet Zihir, and al. "60-GHz 64- and 256-Elements Wafer-Scale Phased-Array Transmitters Using Full-Reticle and Subreticle Stitching Techniques" IEEE Transactions On Microwave Theory and Techniques, Vol. 64, NO. 12, December 2016 suggests to solve the routing problem with an antenna array with a single big chip. All RF modules and digital blocks to control beam steering, RF, DC and digital distribution networks, i.e. SPI connections, are built on the same silicon chip. The chip can be placed on a low-cost printed circuit board, since it requires only the baseband or intermediate frequency signals, a crystal reference signal for the local oscillator, and digital control. The chip is flip chipped with an interposer on which antenna elements of the antenna array are fabricated.

This single chip architecture solves the routing problem. However, use of silicon for distribution of RF signals leads to another problem: millimeter-wave transmission lines on silicon have very high losses. For example, a coplanar waveguide transmission line on silicon has losses around 1.5 dB/mm at 150 GHz (D-band). Dimensions of a 1000 element antenna array at D band is 32×32 mm. To distribute RF signal in such antenna, RF signals need to be distributed by distances of 30 to 40 mm. In such case losses for distribution of RF signals can be as high as 45 to 60 dB. To compensate these losses extra amplifiers are used in known "single" chip architecture, which requests extra power. While an MMIC is not very efficient at high frequencies, these extra amplifiers generate a lot of heat, which complicates thermal management of the antenna array.

Patent application US2020/0194901 discloses a radio frequency antenna array that includes an interposer assembly and conductive pillars. An interposer assembly with a single microstrip trace feeds signal from a small MMIC towards patch antennas arranged in series. Conductive pillars maintain a distance between the interposer and a ground layer on a radio frequency printed circuit board.

SUMMARY

An object is to provide an apparatus so as to solve the problem of reducing power consumption of millimeter-wave antenna arrays and simplify thermal management thereof, while enabling more versatile routing of signals required for operation.

The objects of the present invention are achieved with an apparatus according to the characterizing portion of claim 1.

The preferred embodiments of the invention are disclosed in the dependent claims.

According to a first aspect, a millimeter wave radio frequency, RF, antenna array apparatus is provided. The apparatus comprises a single-chip monolithic microwave integrated circuit, MMIC, comprising active circuit elements of the antenna array apparatus. The active circuit elements comprise at least antenna feed circuitry configured to feed antenna elements of the antenna array. The antenna array apparatus comprises an interposer fabricated of low-loss RF material, such as glass, low-temperature co-fired ceramic, LTCC, or printed circuit board, PCB. The interposer comprises transmission lines of an RF distribution network and a plurality of antenna elements of the antenna array. The transmission lines of the interposer are coupled to the MMIC for providing RF connections for distributing RF signals to and from the antenna feed circuitry. Area of the interposer that comprises the transmission lines of the RF distribution network and the plurality of antenna elements is collocated with the area of the MMIC that comprises said antenna feed circuitry.

According to a second aspect, each portion of the MMIC comprising a portion of the antenna feed circuitry configured to feed the respective antenna element is collocated with the portion of the interposer comprising the respective antenna element.

According to a third aspect, the antenna feed circuitry comprises active circuit elements for performing beamforming, such as a variable gain amplifier, and a phase shifter.

According to a fourth aspect, the antenna array apparatus comprises a plurality of transmit signal paths, each transmit signal path traveling from an output of a transmitter via respective portions of transmission lines of the RF distribution network on the interposer and via respective antenna feed circuitry of the transmit signal path in the MMIC to an input of one of the plurality of antenna elements. Alternatively, or in addition, the antenna array apparatus comprises a plurality of receive signal paths, each receive signal path traveling from an output of one of the plurality of antenna elements via the respective antenna feed circuitry of the receive signal path in the MMIC and via respective portions of the transmission lines of the RF distribution network on the interposer into an input of a receiver.

According to a fifth aspect, the active circuit elements comprise at least one of a transmitter, a receiver, an amplifier, a phase shifter, an analog-to-digital converter, a digital-to-analog converter, and a serial peripheral interface, and wherein the MMIC further comprises DC supply voltage interconnections and/or digital distribution networks such as serial peripheral interface interconnections.

According to a sixth aspect, the RF distribution network comprises one or more power dividers.

According to a seventh aspect, said one or more power dividers are comprised in the MMIC and/or in the interposer.

According to an eighth aspect, the MMIC comprises at least one first power divider on a transmit signal path or a receive signal path, and wherein the interposer comprises one or more further power dividers on the respective transmit or receive signal path, wherein the one or more further power dividers are further away from the respective antenna element, along the respective transmit signal path or receive signal path, than the at least one first power divider.

According to a ninth aspect, power division obtained by said plurality of power dividers is symmetrical or asymmetrical. Possible asymmetry of the power division network is compensated by one or more amplifiers and phase shifters of the antenna feed circuitry.

According to a tenth aspect, the interposer and the MMIC are mutually connected using flip-chip technology that forms a plurality of electrical contacts between the MMIC and the interposer. The electrical contacts are configured to maintain at least a minimum predefined vertical distance between the MMIC and the interposer for avoiding interference.

According to an eleventh aspect, the interposer and the MMIC are mutually connected using both electrical contacts as well as capacitive and/or inductive, coupling, which jointly form the plurality of coupling points between the MMIC and the interposer. The electrical contacts are configured to maintain at least a minimum predefined vertical distance between the MMIC and the interposer for avoiding interference.

According to a twelfth aspect, the plurality of electrical contacts are solder balls, copper pillar bumps or stud bumps.

According to a thirteenth aspect, the interposer is a single-layer or a multi-layered structure.

The present invention is based on the idea of implementing the antenna elements of the antenna array and transmission lines of RF distribution network(s) on an interposer. Active RF elements, as well as digital control, DC operating voltage and digital distribution networks such as serial peripheral interface distribution networks are placed on a single silicon chip. Dimensions of the silicon chip are preferably similar to dimensions of the array of antenna elements on the interposer, so that on the area of the interposer collocated with the antenna array area, only the RF signals on respective transmit and/or receive signal paths are distributed. Other signals may be distributed on the MMIC to outside of antenna area but may also be connected to interposer outside antenna area using flip-chip technique. The interposer is manufactured from low-loss RF material. The MMIC chip is flip chipped on the interposer. DC power feed, digital signals and low frequency RF connectors may also be provided on the interposer for connections to external devices, functions and/or circuitry.

The present invention has the advantage that power consumption of millimeter-wave antenna array is reduced, and thermal management thereof is therefore simplified. By implementing RF transmission lines in the low-loss RF material interposer, losses in transmission lines are reduced in comparison to transmission lines implemented in silicon, which reduces need for additional, power consuming amplifiers. The antenna array is scalable up to hundreds of antenna elements. Another advantage is that DC and lower than RF frequency signals, such as DC, baseband and/or intermediate frequency signals, can be brought outside the antenna array's area within the MMIC and then connected to the interposer. Thus, DC and lower frequency signals may be spread out to a larger area and then connected to the interposer. These signals may be combined using daisy-chain technique, which facilitates reducing number of flip-chip connections needed.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
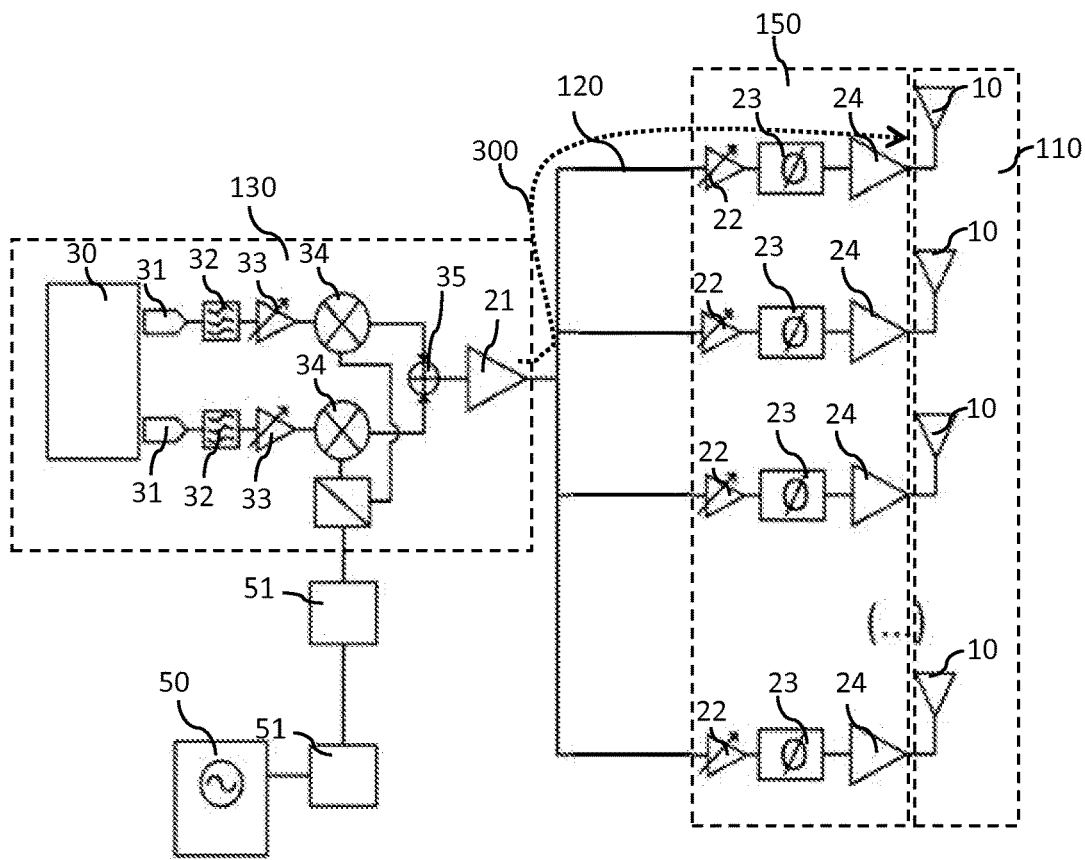
FIG. 1 is a schematic illustration of a transmitter architecture with an antenna array.

The FIG. 1 shows a schematic illustration of a non-limiting, exemplary transmitter architecture with an antenna array (110) with N antenna elements (10) as known in the art. N is an integer, preferably greater than 64, more preferably at least 1000. The transmitter (130) comprises a modem (30) that provides a digital signal to be transmitted over RF interface by the antenna array (110). The transmitter comprises active signal processing elements, such as digital-to-analog converters (31), filters (32), amplifiers (33) and in-phase and quadrature modulators (34) for modulating with a radio frequency signal with in-phase and quadrature carrier signals. A local oscillator signal is generated by a local oscillator (50), and its frequency may be multiplied by one or more frequency multipliers (51) for generating a carrier signal that is modulated by a signal to be transmitted over the radio interface in the transmitter. The modulated in-phase and quadrature phase RF signals are combined by a summing element (35) and fed to an RF distribution network (120) via an amplifier (21). One or more amplifiers (not shown) and power splitters (not shown) may be provided in the RF distribution network (120) for compensating losses in the RF distribution network and to ensure proper signal levels. The RF distribution network delivers the RF signal to antenna feed circuitry (150). The term antenna feed circuitry refers to active circuitry that is specifically configured to feed signal to or from each individual antenna element (10). In other words, the antenna feed circuitry comprises antenna element specific active circuit elements for each antenna element. Antenna feed circuitry (150) of a transmitter may comprise variable gain amplifiers (22) to compensate for variation of gains between transmit signal paths. For beamforming purposes, phase of the RF signal fed to each antenna element (10) may be adjusted with a phase shifter (23), and the RF signal is further amplified with a power amplifier, PA (24) before feeding the signal into the respective antenna element (10). The variable gain amplifier, VGA, (22) may also be used for beamforming, for example to control side lobe levels. The phase shifters (23) may be implemented as vector modulators.

The RF distribution network comprises a plurality of power dividers (not shown), which branch the RF signal into a plurality of transmit signal paths (300) that extend from the output of the transmitter (130) via the RF distribution network (120) to the antenna feed circuitry (150) for feeding the plurality of antenna elements (10). The RF distribution may be branched using various branching schemes as known in the art. One common architecture is based on a tree of subsequent 1 to 2 power dividers, each dividing the incoming signal into two equal portions. The branching is repeated by adding consecutive power dividers until the number of transmit signal paths (300) formed by branches of the RF distribution network that are fed into the antenna feed circuitry (150) is equal to the number of antenna elements (10).

An SPI interface may be used for controlling operation of the phase shifters (23) and VGAs (22) of the antenna feed circuitry (150). Although not shown in the general transmitter architecture, a skilled person understands that control signals need to be carried all the way to the respective active circuit elements, which further increases complexity of required signal routing. SPI routing may be implemented within the MMIC.

Figure 2:
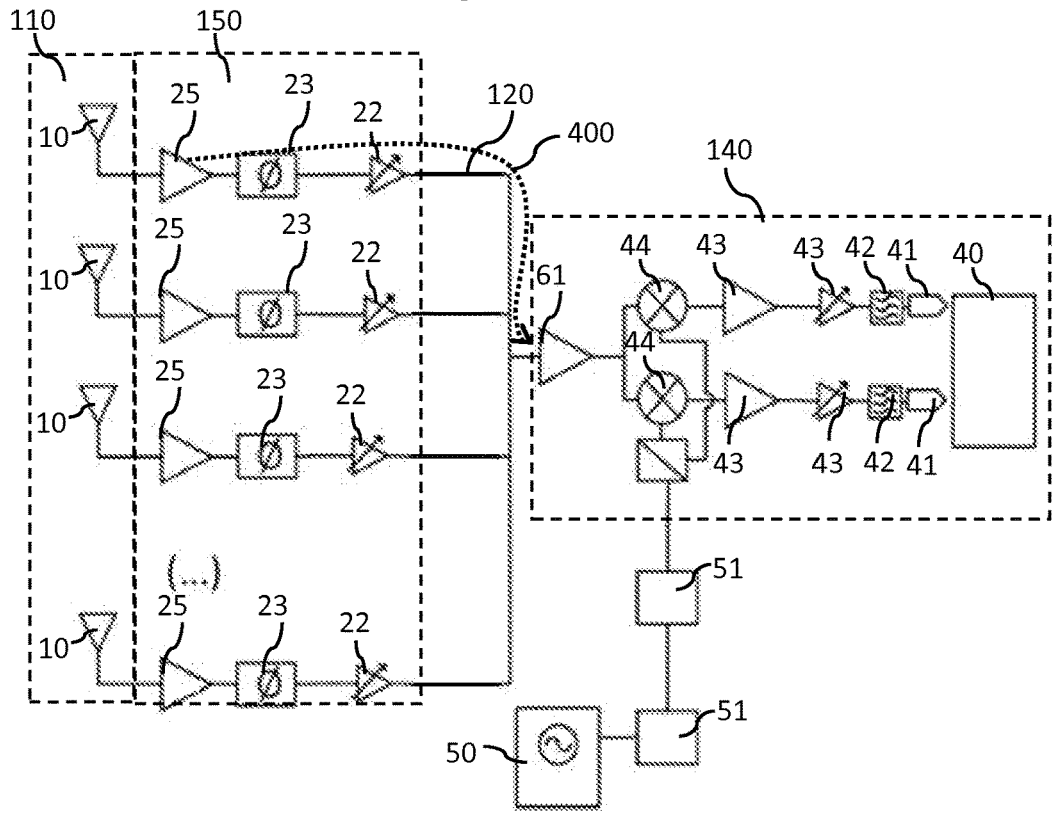
FIG. 2 is a schematic illustration of a receiver architecture with an antenna array.

The FIG. 2 shows a schematic illustration of an exemplary, non-limiting receiver architecture for receiving an RF signal with an antenna array (110) of N antenna elements (10) as known in the art. The RF signal is received by the plurality of antenna elements (10). The term antenna feed circuitry refers to active circuitry that is specifically configured to feed signal to or from each individual antenna element (10). An antenna feed circuitry (150) of a receiver may comprise a low noise amplifier (25) and a phase shifter (23). The antenna feed circuitry (150) may also comprise variable gain amplifiers, VGA, (22) to compensate for possible variation of gains between receive signal paths and for beamforming. The phase shifters (23) may be implemented as vector modulators. The RF distribution network (120) delivers signals received at the output of the antenna feed circuitry (150) towards the input of the receiver (140). The RF distribution preferably comprises a plurality of power dividers (not shown), which collect signals received by the antenna elements (10) and provided at the respective plurality of outputs of the antenna feed network (150), into a single RF signal provided at the input of the receiver (140), which may comprise an amplifier (61) at its input. As known in the art, any branching scheme may be used in the RF distribution network. Each receive signal path (400) of the RF distribution network thus provides a component RF signal from the output of one of the outputs of the antenna feed circuitry (150) to the input of the receiver (140). The receiver (140) may comprise in-phase and quadrature demodulators (44) for demodulating the received RF signal. A local oscillator signal is generated by a local oscillator (50), and its frequency may be multiplied by one or more frequency multipliers (51) to generate a carrier signal for demodulation. The demodulated signal may be amplified with one or more amplifiers (43), filtered by one or more filters (42) and finally converted into a digital signal with analog-to-digital converters (41) for processing the digital signal in the modem (40).

Active circuit elements of the millimeter wave transmitter (130) and/or receiver (140) may be implemented on a single monolithic microwave integrated circuit, MMIC. The modem (40) may be implemented on the MMIC, or it may be implemented on a separate IC.

Like in the transmitter, also in a receiver an SPI interface may be used for controlling operation of active circuit elements of the antenna feed circuitry (150), such as phase shifters (23) and VGA: s (22). Although not shown in the general transmitter architecture, a skilled person understands that control signals need to be carried all the way to the respective active circuit elements, which further increases complexity of required signal routing. SPI routing may be implemented within the MMIC.

Figure 3A:
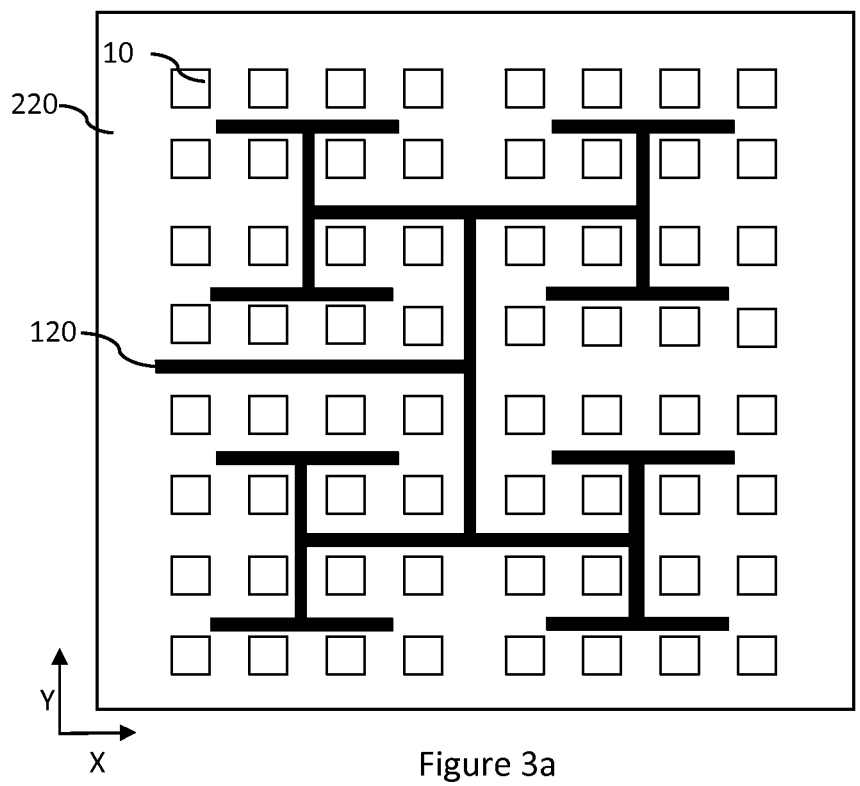
FIG. 3a illustrates schematically a top view of an interposer.

The FIG. 3a illustrates schematically a top view of an interposer (220) according to embodiments of the invention. The interposer is implemented on a low-loss RF material, such as glass, low-temperature co-fired ceramic, LTCC, or printed circuit board, PCB. Described elements are shown schematically as if the interposer (220) was transparent, but as understood by a skilled person, the invention is not limited by visual characteristics of the interposer. Top and bottom refer to levels defined on basis of an orientation of the antenna array apparatus with respect to coordinate axes shown in the figures, in which the antenna elements (10) face up on the top of the structure, towards the positive z-axis and the MMIC is placed below the interposer (220), away from the antenna elements (10) towards the negative z-axis. However, the orientation of the antenna array apparatus when in use is not limited to any orientation. Lateral dimensions refer to dimensions in plane that is parallel to the xy-plane and vertical dimensions refer to the z-axis direction.

The interposer (220) comprises an array of antenna elements (10). For simplicity, this example shows just 64 antenna elements (10), but in practice the interposer may comprise an array of up to more than 1000 antenna elements (10). When implementing a millimeter wave radio device with antenna array, all antenna elements (10) are typically like each other, and preferably placed at even distances from each other, thus forming a symmetrical, square array. Alternative geometries, such as circular, hexagonal or rectangular, may also be used. In some implementations, distance between adjacent antenna elements is $\lambda/2$, where $\lambda$ is the wavelength, as known in the art.

The interposer comprises transmission lines of a RF distribution network (120). The RF distribution network (120) delivers RF signal from an output of a transmitter to the plurality of inputs of the antenna feed circuitry, which is implemented in the MMIC. The MMIC thus comprises the phase shifter (23) and PA (24) and VGA (22) amplifiers for each respective antenna element (10) following the respective transmit signal path (300) or phase shifter (23), Low Noise Amplifier (LNA) (25) and VGA (22) for each respective antenna element (10) preceding the respective receive signal paths (400). The transmit RF signals delivered by the transmit signal paths (300) of the RF delivery network are fed via the active circuit elements of the antenna feed circuitry in the MMIC into inputs of the antenna elements (10) of the antenna array (110) and/or receive RF signals received by antenna elements (10) of the antenna array (110) are delivered from the respective antenna element (10) via the active circuit elements of the antenna feed circuitry in the MMIC into an input of a receiver.

The interposer may be a single-layer structure, in which there is just a single layer of metal on which all transmission lines of the RF distribution network (120) are placed. Preferably, the interposer is a multi-layered structure, in which transmission lines of the RF distribution network (120) can be routed more flexibly. Preferably, transmission lines comprise metal strips, such as coplanar waveguides, microstrip lines and/or striplines, or substrate integrated waveguides optimized for transmission of the high-frequency RF signals. Antenna elements (10) are preferably placed on top face of the interposer (220), while the transmission lines of the RF distribution network may be on the bottom face and/or in the intermediate layers of the interposer structure. Electrical contacts to the RF distribution network (120) are preferably provided at the bottom face of the interposer.

By placing the transmission lines of the RF distribution network (120) on the interposer (220), the interposer may be optimized for significantly reducing losses of the RF signals in comparison to distribution on the MMIC.

The transmission lines of the RF distribution network are not directly coupled to the antennas (10) within the interposer. Although the RF distribution network is schematically shown in the FIG. 3a as a continuous, branching network in the interposer, the RF distribution network may comprise mutually disconnected portions with gaps between consecutive portions, which allow coupling active components implemented in the MMIC or on the interposer between the consecutive portions of the transmission lines of the RF distribution network (120).

In addition to the transmission lines of the RF distribution network, the interposer may comprise transmission lines for local oscillator signals, intermediate frequency signals and/or carrier signals fed towards the mixers, as well as in the antenna feed circuitry. Preferably, signal connections that are not part of the RF distribution network, in other words part of any of the transmit signal chains or receive signal chains, are located outside the lateral area of the interposer that is collocated with the MMIC. The interposer may further comprise power dividers for branching transmission lines.

Figure 3B:
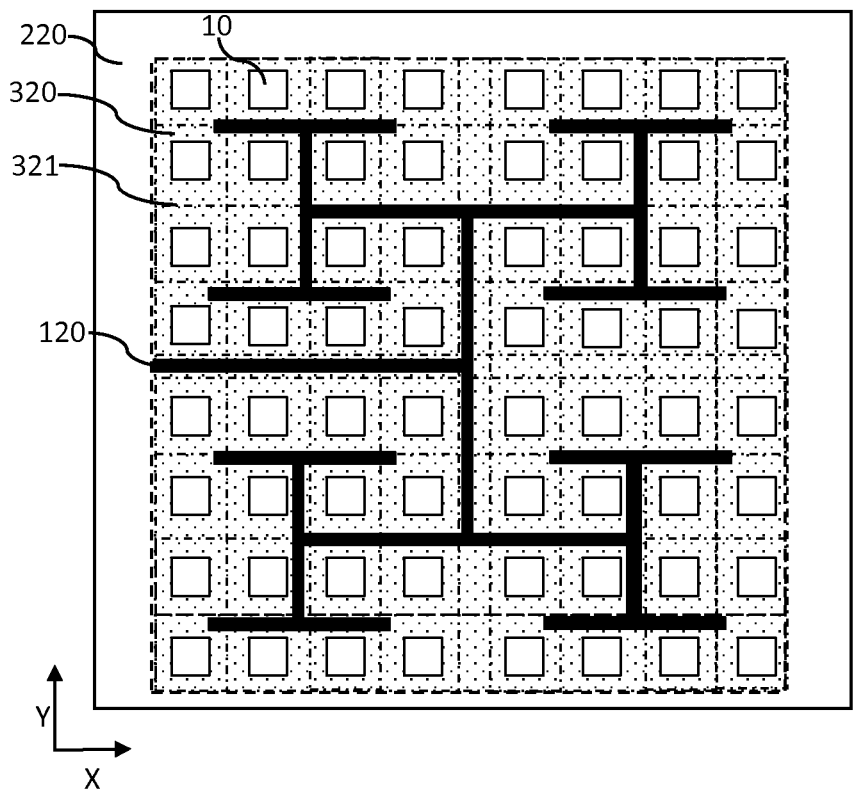
FIG. 3b illustrates schematically a top view of the antenna array apparatus with an MMIC attached with the interposer

FIG. 3b illustrates schematically a top view of the antenna array in which a single monolithic microwave integrated circuit, MMIC, (320) has been attached under the interposer. Lateral dimensions of the portion of the interposer (220) that comprises the RF distribution network and antenna elements, and lateral dimension of the MMIC (320) or portion of the MMIC that comprises the antenna feed circuitry for the antenna array should be essentially similar. The RF distribution network distributes receive RF signals and/or transmit RF signals towards portions of the interposer which are in vicinity of each respective antenna element (10). Active circuitry, including but not limited to the antenna feed circuitry, on the MMIC that processes the receive or transmit RF signal on the respective receive signal path or transmit signal path for a respective antenna element is preferably collocated with the respective antenna element (10), when the MMIC and the interposer are properly placed and connected to each other. This collocation is illustrated by the dashed line grid (321) dividing the lateral area of the MMIC to a plurality of portions, each comprising respective antenna feed circuitry, and each collocated with the respective one of the antenna elements (10). Collocating the antenna element on the interposer and the respective antenna feed circuitry on the MMIC enables keeping RF signal carrying connections short and coupling RF signals on the transmit and receive signal paths between the MMIC and the interposer without need to transfer RF signals along the MMIC. Preferably, interconnections between active circuit elements on the transmit and receive signal paths are implemented on the interposer. In particular, all interconnections between active circuit elements along the RF distribution network are preferably implemented on the interposer. Some very short interconnections between active circuit elements of the antenna feed circuitry that are right next to each other on the MMIC may be implemented on the MMIC as long as these interconnections are short enough for not unnecessarily increasing losses. As already mentioned above, other signals such as local oscillator, intermediate frequency and DC signals may also be carried on the interposer, but preferably outside the lateral area of the interposer that is collocated with the MMIC.

Figure 4:
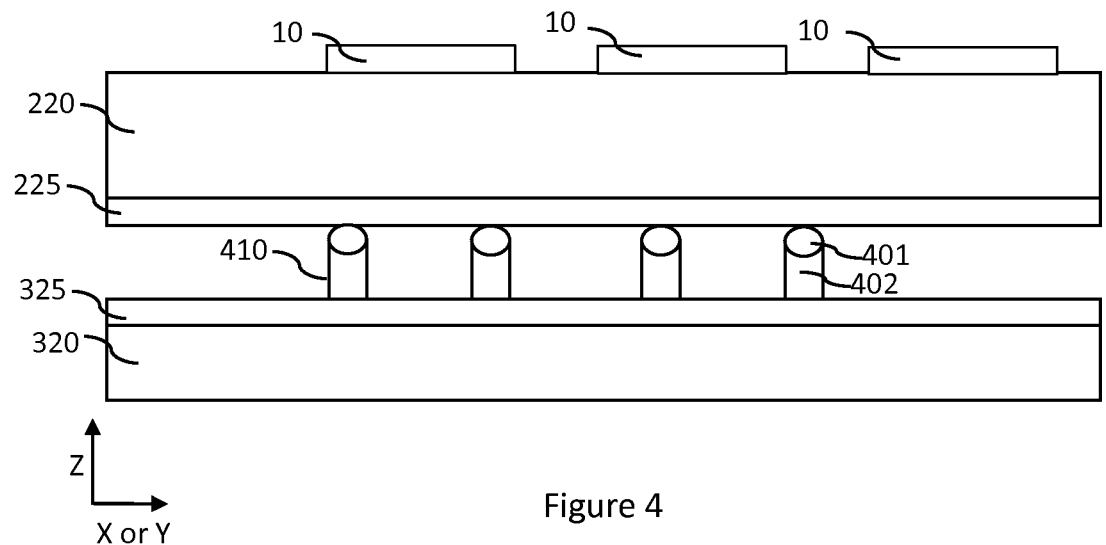
FIG. 4 illustrates schematically a side view of an antenna array apparatus

The FIG. 4 illustrates schematically a side view of the principle of the mechanical structure of an antenna array apparatus according to the embodiments. The MMIC (320) is shown on the bottom and the interposer (220) is placed on top of the MMIC, with antenna elements (10) on the top face of the interposer (220). On the top face of the MMIC (320), towards the interposer (220), there is a first layer (325) comprising electrical connections for electrically coupling various active circuit elements of the MMIC (320) towards the interposer (220). On the bottom face of the interposer (220), there is a second layer (225) that comprises conductive patterns that provide electrical coupling of the transmission lines of the RF distribution network towards the MMIC (320), and optionally also electrical coupling for transmission lines of local oscillator signals, IF signals and/or carrier signals.

There is a plurality of electrical contacts (410) between the MMIC (320) and the interposer (220), wherein electrical contacts provide galvanic coupling. These electrical contacts (410) may be implemented with solder balls (solder bumps) as known in ball grid array (BGA) flip-chip technology. The electrical contacts (410) may be so called stud bumps, in which metal bumps, for example silver or gold bumps are applied mechanically on a wafer or chip, which is also a well-known in flip-chip technology area. The electrical contacts (410) may be so-called copper pillar bumps, comprising a copper pillar (402) capped with a solder ball (401), also well known in flip-chip technology area. As known, such copper pillar bump flip chip technology provides excellent electrical and thermal coupling for high density connections. The ball grid array, the stud bump and the copper pillar bump technology all produce a vertical distance between the interposer and the MMIC. The copper pillar bump technology provides a further benefit that it enables accurate control of the vertical distance between the MMIC (320) and the interposer (220), which may be important for avoiding interference. Volume between the MMIC (320) and the interposer (220) between the electrical contacts (410) may be filled with gas, for example air, or it may be a vacuum. Preferred distance between the MMIC and the interposer varies in dependence of for example materials, design and frequency. With commonly used PCB materials a gap that is wider than 100 µm is preferred for mm-wave implementations.

Instead of or in addition to electrical contacts, at least some signals may also be coupled capacitively between the MMIC and the interposer. For capacitive coupling, feed elements or coupling elements are provided on the MMIC, which may couple capacitively RF signals for example to portions of transmission lines of the RF distribution network or to antenna elements on the interposer. Above mentioned publication 60-GHz 64- and 256-Elements Wafer-Scale Phased-Array Transmitters Using Full-Reticle and Subreticle Stitching Techniques discloses an example of capacitive coupling between the MMIC and antenna elements.

Even further feeding schemes may be applicable for feeding the antennas and for coupling the transmission lines on the interposer with the MMIC. For example, inductive coupling, also referred to as aperture coupling, or feeding-probe type coupling may be used at any suitable point of the transmit and receive chain.

For example, some portions of coupling between the interposer and the MMIC may be capacitive or inductive, while other portions of contacts are of electrical type, for example one of the above-mentioned flip-chip connections. The flip-chip connections facilitate maintaining the gap between the interposer and the MMIC.

Figure 5:
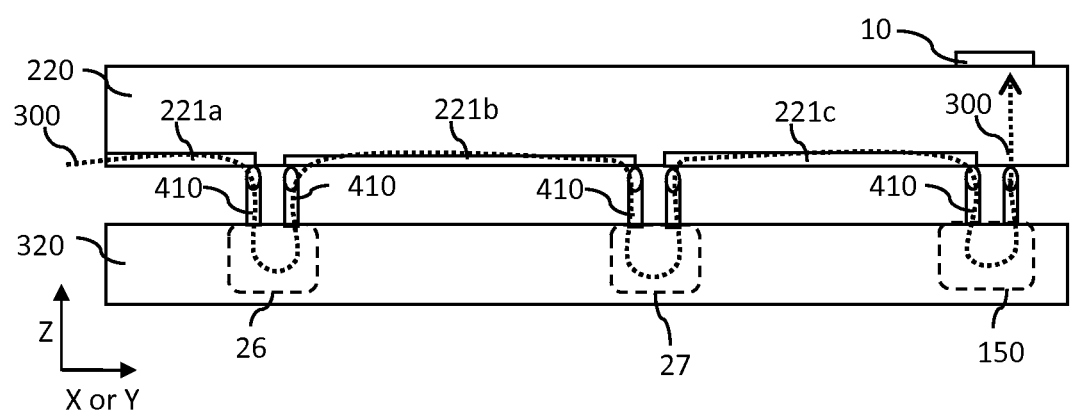
FIG. 5 illustrates schematically transmission of an RF signal in RF distribution network in the antenna array apparatus

The FIG. 5 illustrates schematically how an RF signal is carried over the RF distribution network (120). This example illustrates a portion of a transmit signal path (300), but the same principle is applicable to an RF signal on a receive signal path. The RF signal travels back and forth via the electrical contacts (410) between active circuit elements (26, 27, 28) on the MMIC (320) and portions of transmission lines (221a, 221b, 221c) of the RF distribution network (120) on the interposer (220). Some exemplary elements of a single transmit signal path is shown in this simplified illustration. It is clear to a skilled person, that the types and order of the active circuit elements depends on an architecture of the transmitter/receiver and the RF distribution network thereof, and is not limited to any specific active circuit elements or to any particular order of the active circuit elements.

In this example, the RF transmit signal arrives from the transmitter via a first portion of the transmission line (221a) of the RF distribution network into a power divider (26), for dividing the transmit signal to at least two different transmit signal paths. The power divider(s) may be for example of type disclosed in patent application WO2020/188146 A1. The transmit signal is then forwarded over electrical contacts (410) and a second portion of the transmission line (221b) towards an optional RF line amplifier (27), and finally over a third portion of the transmission line (221c) towards the antenna feed circuitry (150) of the respective transmit signal path. As show in the drawing, the antenna feed circuitry (150) of each respective transmit signal path or receive signal path in the MMIC (320) is preferably collocated with the respective antenna element (10) on the interposer (220). The antenna feed circuitry (150) of the transmit signal path on the MMIC (320) may comprise active circuit elements, such as a variable gain amplifier (22), phase shifter (23) and/or power amplifier, PA, (24) as shown in the FIG. 1. Finally, the RF transmit signal is provided to the antenna element (10) for transmission via the interposer (220).

In some embodiments, the interposer (220) may also comprise one or more power dividers. Preferably, power dividers that are closest to the respective antenna element on the transmit or receive signal path are implemented on the MMIC. This is mainly due to space limitations. Beamforming circuits, i.e. vector modulator or phase shifter (23), VGA (22) and PA (24) in the transmitter or LNA (25), VGA (22) and phase shifter (23) or vector modulator in receiver, are preferably located in vicinity of each respective antenna element on the MMIC. Therefore, there is quite limited space for a power divider in the interposer quite next to these active circuit elements of the antenna feed circuitry (150). At D-band frequencies and also lower frequencies, multi-channel MMIC's are typically used due to space limitations. With multi-channel MMIC's we refer 2 or more channels, may be 4 channels. The power division is preferably done on the MMIC. If there is enough space for a single channel approach, also the final division could be on interposer.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A millimeter wave radio frequency, RF, antenna array apparatus comprising a single-chip monolithic microwave integrated circuit, MMIC, comprising active circuit elements of the antenna array apparatus, wherein the active circuit elements comprise circuit elements of a transmitter or a receiver and antenna feed circuitry configured to feed a plurality of antenna elements of the antenna array, the antenna array apparatus comprising:

an interposer fabricated of low-loss RF material, such as glass, low-temperature co-fired ceramic, LTCC, or printed circuit board, PCB, wherein the interposer comprises transmission lines of a RF distribution network and the plurality of antenna elements of the antenna array, and electrical contacts between the interposer and the MMIC, wherein said transmission lines of the RF distribution network on the interposer are coupled to the MMIC for providing RF connections for distributing RF signals via active circuit elements of the MMIC to and from the antenna feed circuitry comprised in the MMIC, so that the RF signal travels via said electrical contacts back and forth between active circuit elements in the MMIC and portions of transmission lines of the RF distribution network in the interposer and in that area of the interposer that comprises said transmission lines of the RF distribution network and the plurality of antenna elements is similar to lateral dimensions and collocated with the area of the MMIC that comprises said antenna feed circuitry, so that active circuitry on the MMIC that processes a receive RF signal on a respective receive signal path or a transmit RF signal on a respective transmit signal path for a respective antenna element is collated with the respective antenna element.

2. The antenna array apparatus according to claim 1, wherein each portion of the MMIC comprising a portion of the antenna feed circuitry configured to feed the respective antenna element is collocated with the portion of the interposer comprising the respective antenna element.

3. The antenna array apparatus according to claim 1, wherein the antenna feed circuitry comprises active circuit elements for performing beamforming, such as a variable gain amplifier, and a phase shifter.

4. The antenna array apparatus according to claim 1, wherein the antenna array apparatus comprises a plurality of said transmit signal paths, each transmit signal path being a route traveling from an output of the transmitter via respective portions of transmission lines of the RF distribution network on the interposer and via respective antenna feed circuitry of the transmit signal path in the MMIC to an input of one of the plurality of antenna elements, and/or wherein the antenna array apparatus comprises a plurality of said receive signal paths, each receive signal path being a route traveling from an output of one of the plurality of antenna elements via the respective antenna feed circuitry of the receive signal path in the MMIC and via respective portions of the transmission lines of the RF distribution network on the interposer into an input of the receiver.

5. The antenna array apparatus according to claim 1, wherein the active circuit elements comprise at least one of a transmitter, a receiver, an amplifier, a phase shifter, an analog-to-digital converter, a digital-to-analog converter, and a serial peripheral interface, and wherein the MMIC further comprises DC supply voltage interconnections and/or digital distribution networks such as serial peripheral interface interconnections.

6. The antenna array apparatus according to claim 1, wherein the RF distribution network comprises one or more power dividers.

7. The antenna array apparatus according to claim 6, wherein said one or more power dividers are comprised in the MMIC and/or in the interposer.

8. The antenna array apparatus according to claim 7, wherein the MMIC comprises at least one first power divider on a transmit signal path or a receive signal path, and wherein the interposer comprises one or more further power dividers on the respective transmit or receive signal path, wherein the one or more further power dividers are further away from the respective antenna element, along the respective transmit signal path or receive signal path, than the at least one first power divider.

9. The antenna array apparatus according to claim 6, wherein power division obtained by said plurality of power dividers is symmetrical or asymmetrical, and wherein possible asymmetry of the power division network is compensated by one or more amplifiers and phase shifters of the antenna feed circuitry.

10. The antenna array apparatus according to claim 1, wherein the interposer and the MMIC are mutually connected using flip-chip technology that forms the plurality of electrical contacts between the MMIC and the interposer, wherein the electrical contacts are configured to maintain at least a minimum predefined vertical distance between the MMIC and the interposer for avoiding interference.

11. The antenna array apparatus according to claim 10, wherein the plurality of electrical contacts are solder balls, copper pillar bumps or stud bumps.

12. The antenna array apparatus according to claim 1, wherein the interposer and the MMIC are mutually connected using both electrical contacts and electromagnetic coupling, such as capacitive or inductive coupling, which jointly form a plurality of coupling points between the MMIC and the interposer, wherein the electrical contacts are configured to maintain at least a minimum predefined vertical distance between the MMIC and the interposer for avoiding interference.

13. The antenna array apparatus according to claim 1, wherein
the interposer is a single-layer or a multi-layered structure.

* * * * *